(12) United States Patent
Venugopal et al.

(10) Patent No.: US 11,582,761 B2
(45) Date of Patent: Feb. 14, 2023

(54) QUASI CO-LOCATION REFERENCE SIGNALS FOR UPLINK TRANSMISSION CONFIGURATION INDICATOR STATES

(71) Applicant: QUALCOMM Incorporated, San Diego, CA (US)

(72) Inventors: Kiran Venugopal, Raritan, NJ (US); Yan Zhou, San Diego, CA (US); Tao Luo, San Diego, CA (US); Tianyang Bai, Somerville, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/109,248

(22) Filed: Dec. 2, 2020

(65) Prior Publication Data

US 2021/0185688 A1 Jun. 17, 2021

Related U.S. Application Data

(60) Provisional application No. 62/948,160, filed on Dec. 13, 2019.

(51) Int. Cl.
*H04W 72/04* (2009.01)
*H04L 5/00* (2006.01)
(Continued)

(52) U.S. Cl.
CPC .......... *H04W 72/0493* (2013.01); *H04B 7/01* (2013.01); *H04B 7/0626* (2013.01);
(Continued)

(58) Field of Classification Search
CPC ........... H04W 72/0493; H04W 56/001; H04W 74/0833; H04W 72/1231; H04W 72/1289;
(Continued)

(56) References Cited

U.S. PATENT DOCUMENTS

2018/0146438 A1* 5/2018 Yi ..................... H04L 1/1812
2020/0022172 A1* 1/2020 Sun .................... H04L 5/0051
(Continued)

FOREIGN PATENT DOCUMENTS

CN 109802787 A * 5/2019 ............... H04B 7/06
CN 109802787 A 5/2019

OTHER PUBLICATIONS

"Agreements up to RAN1#99 on Multi-Beam1 (AI 7.2.8.3)", 3GPP Draft; R1-1913604, 3rd Generation Partnership Project (3GPP), Mobile Competence Centre; 650, Route Des Lucioles; F-06921 Sophia-Anti polis Cedex; France, Nov. 27, 2019 (Nov. 27, 2019), pp. 1-11, XP051831459, Retrieved from the Internet: URL: https://ftp.3gpp.org/tsg_ran/WG1_RL1/TSGR1_99/Docs/R1-1913604.zip FL Summary NR_eMIMO RAN1#99- MBI.docx [retrieved on Nov. 27, 2019] Section 2.2.
(Continued)

*Primary Examiner* — Hardikkumar D Patel
(74) *Attorney, Agent, or Firm* — Patterson & Sheridan, L.L.P.

(57) ABSTRACT

Certain aspects of the present disclosure provide techniques for quasi co-location (QCL) reference signals for uplink transmission configuration indicator (TCI) states. An example method generally includes receiving uplink transmission configuration indicator (TCI) indicating one or more quasi co-location (QCL) types, from a plurality of uplink QCL types, for one or more source reference signals (RSs); and sending an uplink transmission in accordance with the uplink TCI.

28 Claims, 13 Drawing Sheets

(51) Int. Cl.
  *H04W 74/08* (2009.01)
  *H04W 56/00* (2009.01)
  *H04L 25/02* (2006.01)
  *H04B 7/06* (2006.01)
  *H04B 7/01* (2006.01)

(52) U.S. Cl.
  CPC ............ *H04L 5/005* (2013.01); *H04L 5/0023* (2013.01); *H04L 25/0226* (2013.01); *H04W 56/001* (2013.01); *H04W 74/0833* (2013.01)

(58) Field of Classification Search
  CPC ... H04W 72/1268; H04B 7/01; H04B 7/0626; H04B 7/0695; H04L 5/0023; H04L 5/005; H04L 25/0226; H04L 5/0091; H04L 5/0048
  See application file for complete search history.

(56) References Cited

U.S. PATENT DOCUMENTS

| | | | |
|---|---|---|---|
| 2020/0187128 A1* | 6/2020 | Yao | H04W 52/146 |
| 2020/0383096 A1 | 12/2020 | Yang et al. | |
| 2021/0314062 A1* | 10/2021 | Kakishima | H04B 7/088 |
| 2021/0391899 A1* | 12/2021 | Cao | H04B 17/373 |

OTHER PUBLICATIONS

International Search Report and Written Opinion—PCT/US2020/063087—ISA/EPO—Mar. 10, 2021.

* cited by examiner

| Valid UL-TCI state Configuration | Source (reference) RS | (target) UL RS | [qcl-Type] |
|---|---|---|---|
| 1 | SRS resource (for BM) + [panel ID] | DM-RS for PUCCH or SRS or PRACH | Spatial-relation |
| 2 | DL RS(a CSI-RS resource or a SSB) + [panel ID] | DM-RS for PUCCH or SRS or PRACH | Spatial-relation |
| 3 | DL RS(a CSI-RS resource or a SSB) + [panel ID] | DM-RS for PUSCH | Spatial-relation + [port(s)-indication] |
| 4 | DL RS(a CSI-RS resource or a SSB) and SRS resource + [panel ID] | DM-RS for PUSCH | Spatial-relation + [port(s)-indication] |
| 5 | SRS resource + [panel ID] | DM-RS for PUSCH | Spatial-relation + [port(s)-indication] |
| 6 | UL RS(a SRS for BM) and SRS resource + [panel ID] | DM-RS for PUSCH | Spatial-relation + [port(s)-indication] |

FIG. 9

QUASI CO-LOCATION REFERENCE SIGNALS FOR UPLINK TRANSMISSION CONFIGURATION INDICATOR STATES

CROSS-REFERENCE TO RELATED APPLICATION(S)

This application claims benefit of and priority to U.S. Provisional Application No. 62/948,160, filed Dec. 13, 2019, which is hereby assigned to the assignee hereof and hereby expressly incorporated by reference herein in its entirety as if fully set forth below and for all applicable purposes.

FIELD OF THE DISCLOSURE

Aspects of the present disclosure relate to wireless communications, and more particularly, to techniques for quasi co-location (QCL) reference signals for uplink transmission configuration indicator (TCI) states.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or a 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a central unit, may define an access node (e.g., which may be referred to as a BS, a 5G NB, a next generation NodeB (gNB or gNodeB), a transmit receive point (TRP), etc.). A BS or DU may communicate with a set of UEs on downlink channels (e.g., for transmissions from a base station or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. NR (e.g., 5G NR) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication performed by a user equipment (UE). The method generally includes receiving an uplink transmission configuration indicator (TCI) indicating one or more uplink quasi co-location (QCL) types, for one or more source reference signals (RSs). The method generally includes sending an uplink transmission in accordance with the uplink TCI.

Certain aspects of the present disclosure provide a method for wireless communication by a network entity. The method generally includes sending an uplink TCI to a UE, the uplink TCI indicating one or more QCL types from a plurality of uplink QCL types for one or more RSs). The method generally includes sending at least one of the source RSs to the UE. The method generally includes receiving, from the UE, an uplink transmission in accordance with the uplink TCI.

Certain aspects provide an apparatus for wireless communication. The apparatus generally includes at least one processor and a memory coupled to the at least one processor. The memory generally includes code executable by the at least one processor to cause the apparatus to receive an uplink TCI indicating one or more uplink QCL types, for one or more source RSs. The memory generally includes code executable by the at least one processor to cause the apparatus to send an uplink transmission in accordance with the uplink TCI.

Certain aspects provide an apparatus for wireless communication. The apparatus generally includes at least one processor and a memory coupled to the at least one processor. The memory generally includes code executable by the at least one processor to cause the apparatus to send an uplink TCI to a UE, the uplink TCI indicating one or more QCL types from a plurality of uplink QCL types for one or more RSs. The memory generally includes code executable by the at least one processor to cause the apparatus to send at least one of the source RSs to the UE. The memory generally includes code executable by the at least one processor to cause the apparatus to receive, from the UE, an uplink transmission in accordance with the uplink TCI.

Certain aspects provide an apparatus for wireless communication. The apparatus generally includes means for receiving an uplink TCI indicating one or more uplink QCL types, for one or more source RSs. The apparatus generally includes means for sending an uplink transmission in accordance with the uplink TCI.

Certain aspects of the present disclosure provide an apparatus for wireless communication. The apparatus generally includes means for sending an uplink TCI to a UE, the uplink TCI indicating one or more QCL types from a plurality of uplink QCL types for one or more RSs. The apparatus generally includes means for sending at least one of the source RSs to the UE. The apparatus generally includes means receiving, from the UE, an uplink transmission in accordance with the uplink TCI.

Certain aspects provide a computer readable medium storing computer executing code thereon for wireless communication. The computer readable medium generally includes code for receiving an uplink TCI indicating one or more uplink QCL types, for one or more source RSs. The computer readable medium generally includes code for sending an uplink transmission in accordance with the uplink TCI.

Certain aspects of the present disclosure provide a computer readable medium storing computer executing code thereon for wireless communication. The computer readable medium generally includes code for sending an uplink TCI to a UE, the uplink TCI indicating one or more QCL types from a plurality of uplink QCL types for one or more RSs. The computer readable medium generally includes code for sending at least one of the source RSs to the UE. The computer readable medium generally includes code for receiving, from the UE, an uplink transmission in accordance with the uplink TCI.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 9 is a table illustrating example uplink transmission configuration indicator (TCI) states, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
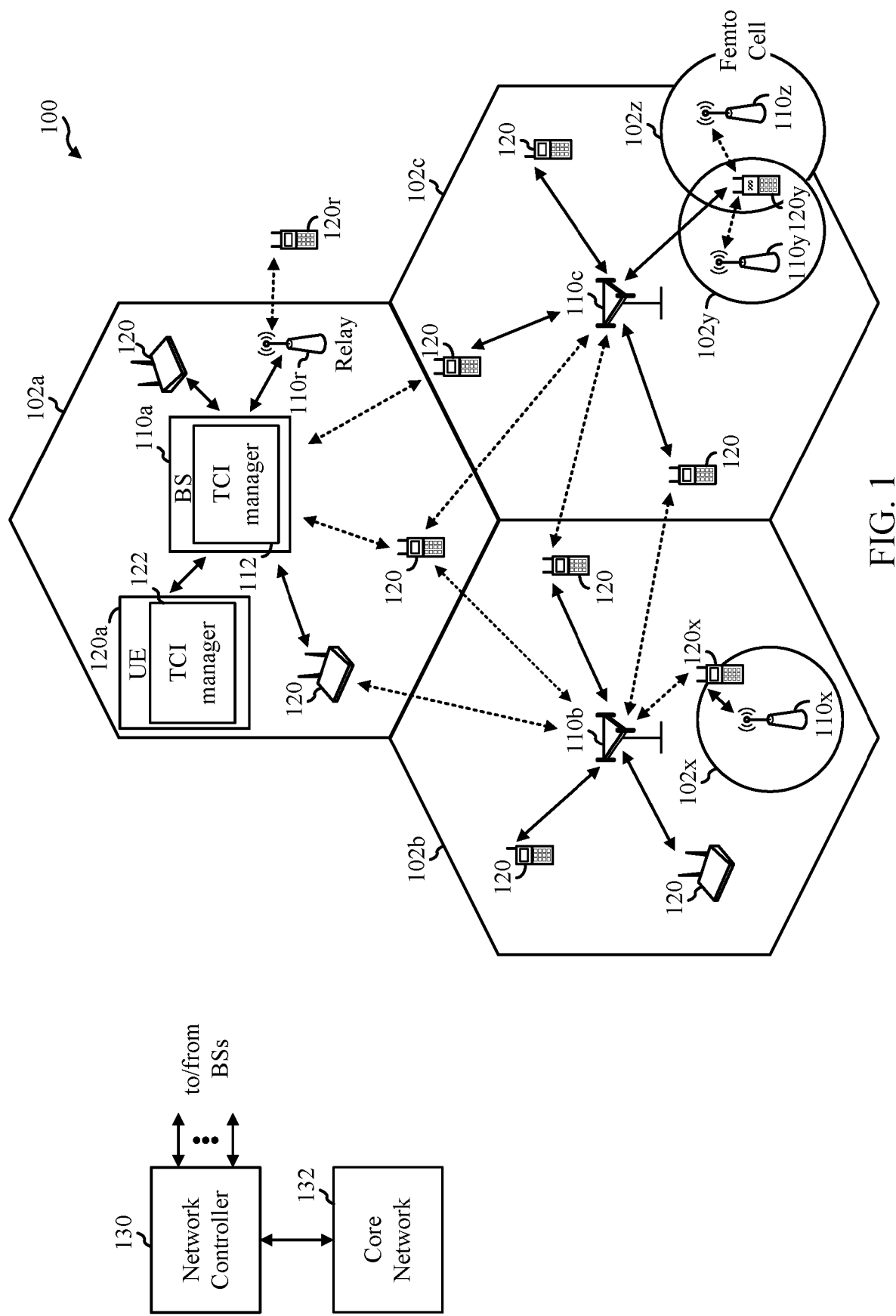
FIG. 1 is a block diagram conceptually illustrating an example telecommunications system, in accordance with certain aspects of the present disclosure.

Aspects of the present disclosure provide apparatus, devices, methods, processing systems, and computer readable mediums for quasi co-location (QCL) reference signals for uplink transmission configuration indicator (TCI) states.

Aspects of the present disclosure may help provide a unified framework for uplink and downlink TCI states. In the unified framework, a base station (BS) can configure and/or indicate antenna panel-specific transmission for uplink transmission, via an uplink TCI.

The following description provides examples of QCL RS for TCI states, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area to avoid interference between wireless networks of different RATs. In some cases, new radio (NR) RAT networks may be deployed.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access (e.g., 5G technology) may support various wireless communication services, such as enhanced mobile broadband (eMBB) targeting wide bandwidth, millimeter wave (mmW) targeting high carrier frequency, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support multiple (e.g., up to 8) transmit antennas with multi-layer DL transmissions (e.g., up to 8 streams) and multiple (e.g., up to 2) streams per UE. Aggregation of multiple cells may be supported (e.g., up to 8 serving cells).

FIG. 1 illustrates an example wireless communication network 100 (e.g., an NR/5G network), in which aspects of the present disclosure may be performed. As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

According to certain aspects, the BSs 110 and UEs 120 may be configured for quasi co-location (QCL) reference signals for uplink transmission configuration indicator (TCI) states. As shown in FIG. 1, the BS 110a includes a TCI state manager 112. The TCI state manager 112 may be configured to send an uplink TCI indicating one or more uplink quasi co-location (QCL) types, from a plurality of uplink QCL types, for one or more source reference signals (RSs), in accordance with aspects of the present disclosure. The UE 120a includes a TCI state manager 122. The TCI state manager 122 may be configured to receive an uplink TCI indicating one or more uplink QCL types, from a plurality of uplink QCL types, for one or more source RSs, in accordance with aspects of the present disclosure.

A BS 110a may provide communication coverage for a particular geographic area, sometimes referred to as a "cell", which may be stationary, or may move according to the location of a mobile BS. In some examples, the BSs 110 may be interconnected to one another and/or to one or more other BSs or network nodes (not shown) in wireless communication network 100 through various types of backhaul interfaces, (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

A network controller 130 may couple to a set of BSs and provide coordination and control for these BSs. The network controller 130 may communicate with the BSs 110 via a backhaul. In aspects, the network controller 130 may be in communication with the core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

Figure 2:
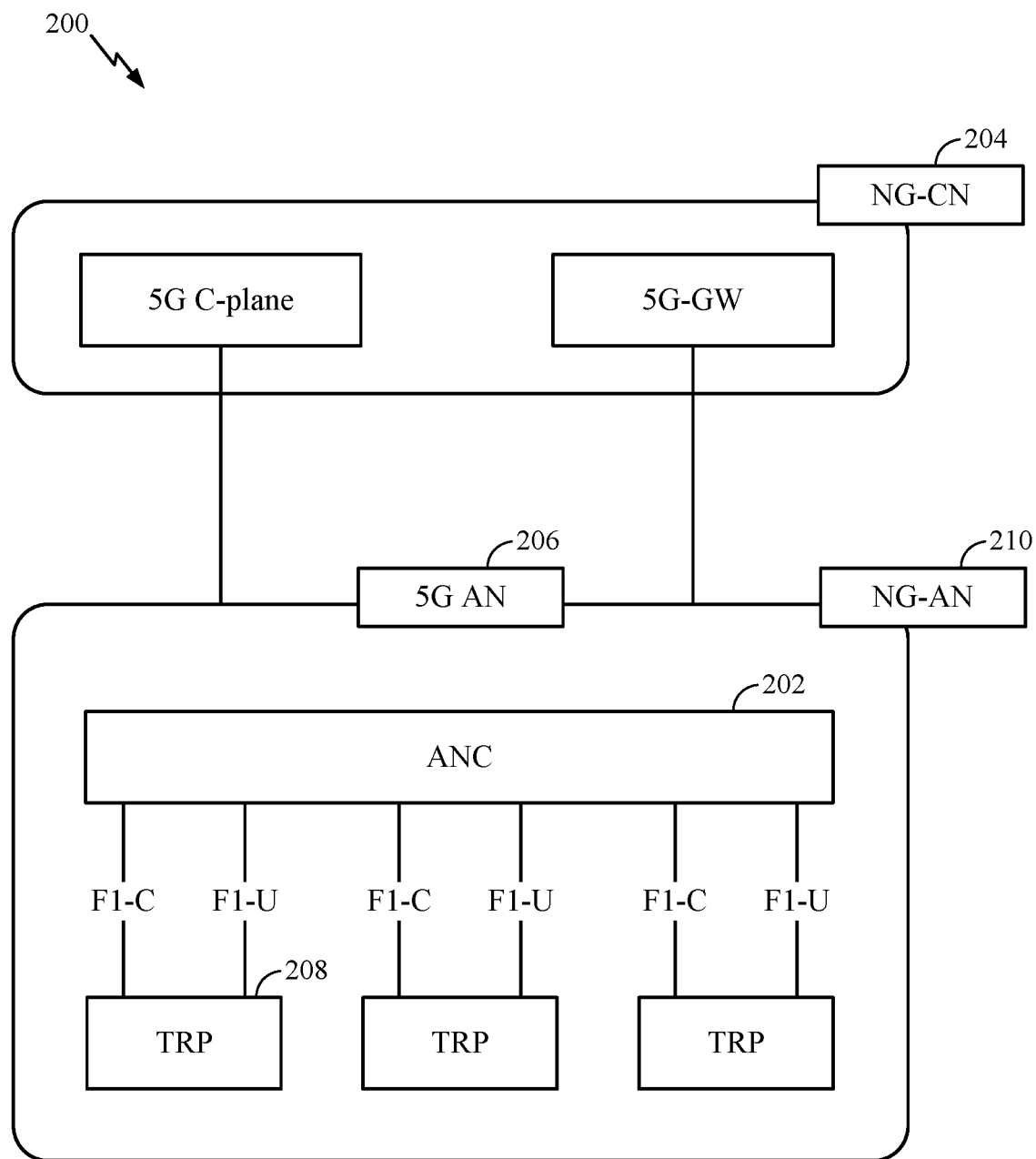
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific ANC deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support various backhauling and fronthauling solutions. This support may occur via and across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
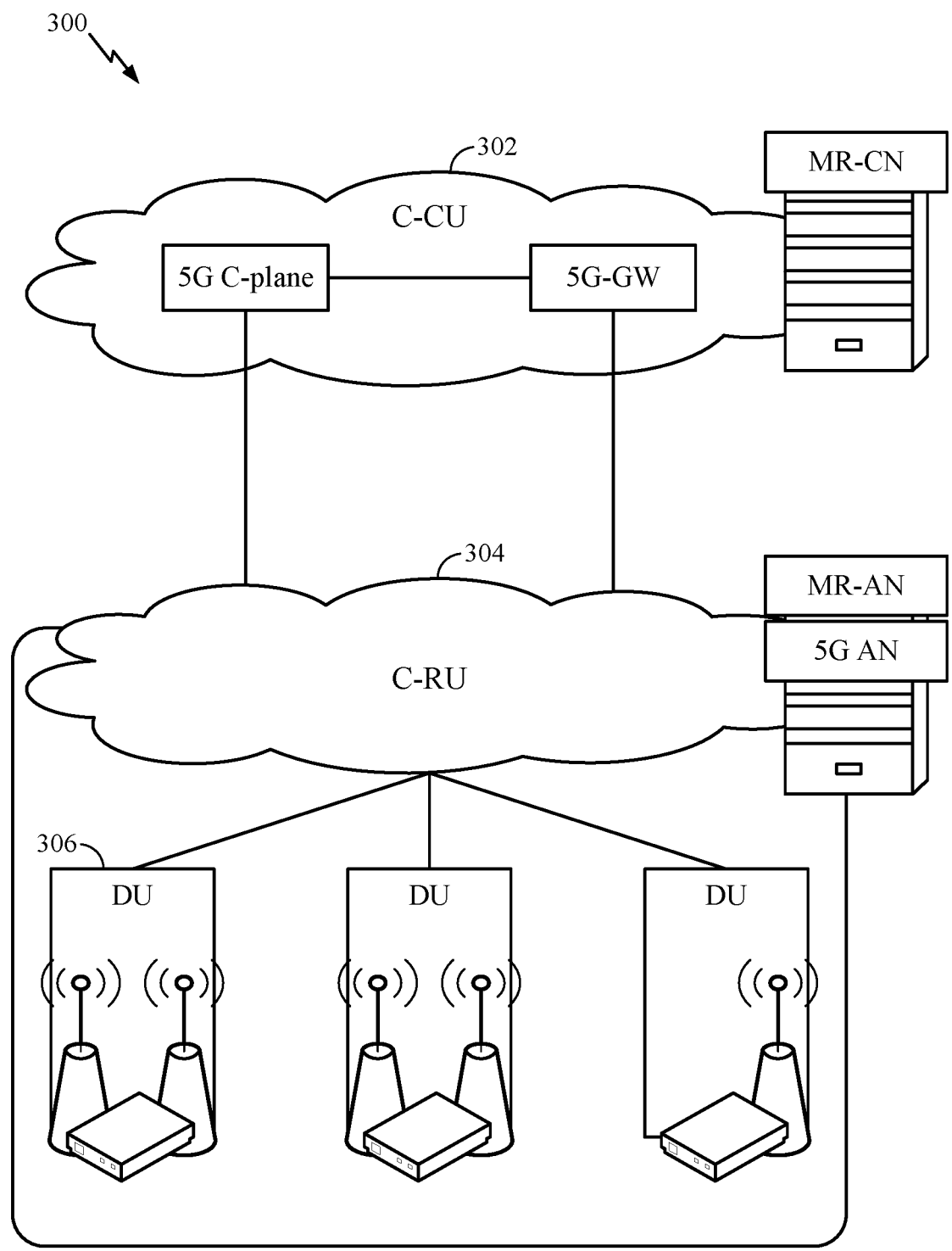
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
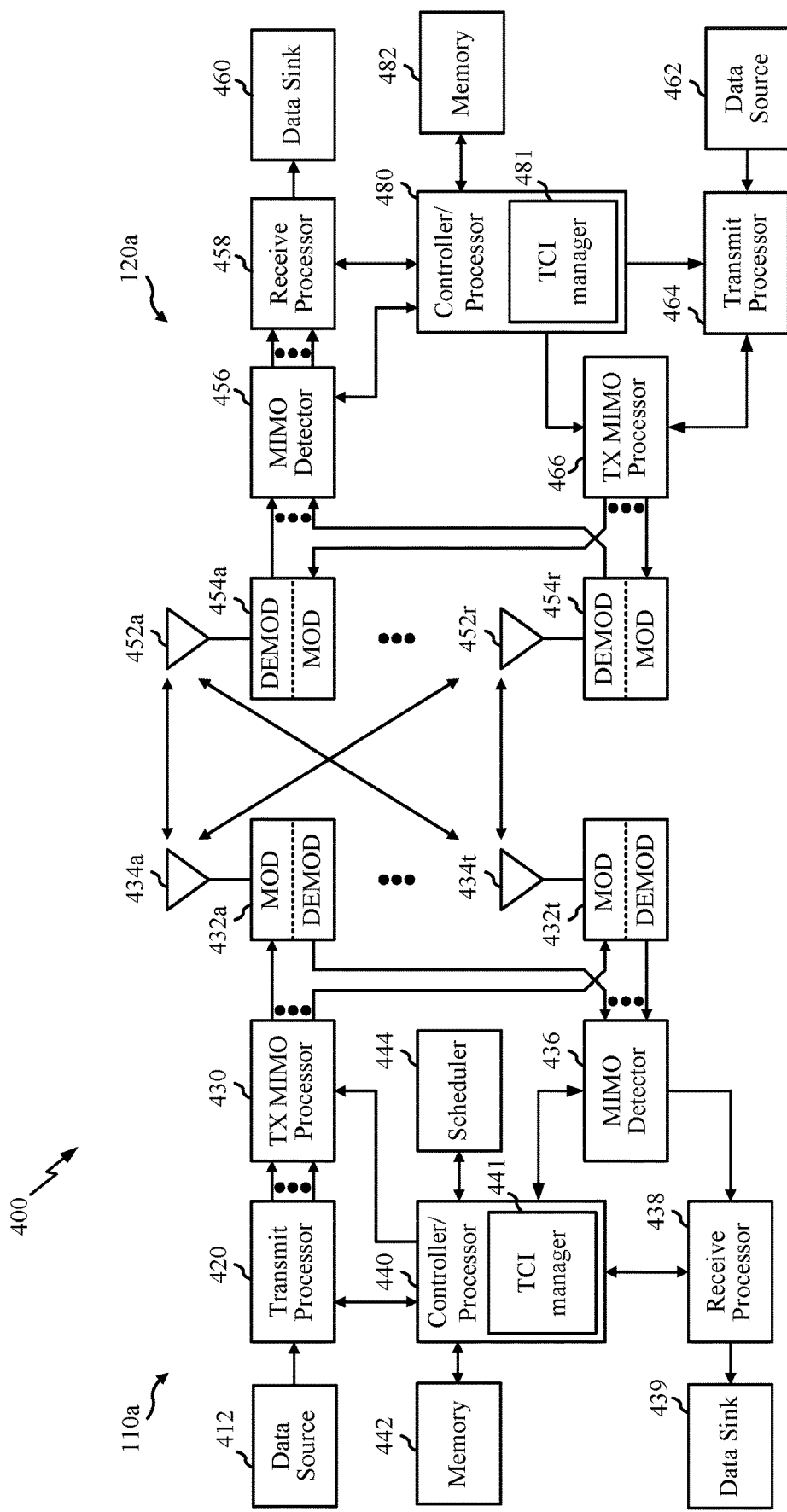
FIG. 4 is a block diagram conceptually illustrating a design of an example base station (BS) and user equipment (UE), in accordance with certain aspects of the present disclosure.

FIG. 4 illustrates example components of BS 110a and UE 120a (e.g., the wireless communication network 100 of FIG. 1), which may be used to implement aspects of the present disclosure.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 420 may process (e.g., encode and symbol map) the data and control information to obtain data symbols and control symbols, respectively. The transmit processor 420 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) in transceivers 432a-432t. Each modulator in transceivers 432a-432t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 432a-432t may be transmitted via the antennas 434a-434t, respectively.

At the UE 120a, the antennas 452a-452r may receive the downlink signals from the BS 110a and may provide received signals to the demodulators (DEMODs) in transceivers 454a-454r, respectively. Each demodulator in transceivers 454a-454r may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators in transceivers 454a-454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the modulators in transceivers 454a-454r (e.g., for SC-FDM, etc.), and transmitted to the BS 110a. At the BS 110a, the uplink signals from the UE 120a may be received by the antennas 434, processed by the demodulators in transceivers 432a-432t, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The memories 442 and 482 may store data and program codes for BS 110a and UE 120a, respectively. A scheduler 444 may schedule UEs for data transmission on the downlink and/or uplink.

Antennas 452, processors 466, 458, 464, and/or controller/processor 480 of the UE 120*a* and/or antennas 434, processors 420, 430, 438, and/or controller/processor 440 of the BS 110*a* may be used to perform the various techniques and methods described herein. For example, as shown in FIG. 2, the controller/processor 440 of the BS 110*a* has a TCI state manager 441 that sends an uplink TCI to a UE, the uplink TCI indicating one or more QCL types from a plurality of uplink QCL types for one or more RSs, according to aspects described herein. As shown in FIG. 2, the controller/processor 480 of the UE 120*a* has a TCI state manager 481 that receives an uplink TCI, the uplink TCI indicating one or more QCL types from a plurality of uplink QCL types for one or more RSs, according to aspects described herein. Although shown at the controller/processor, other components of the UE 120*a* and BS 110*a* may be used to perform the operations described herein.

Figure 5:
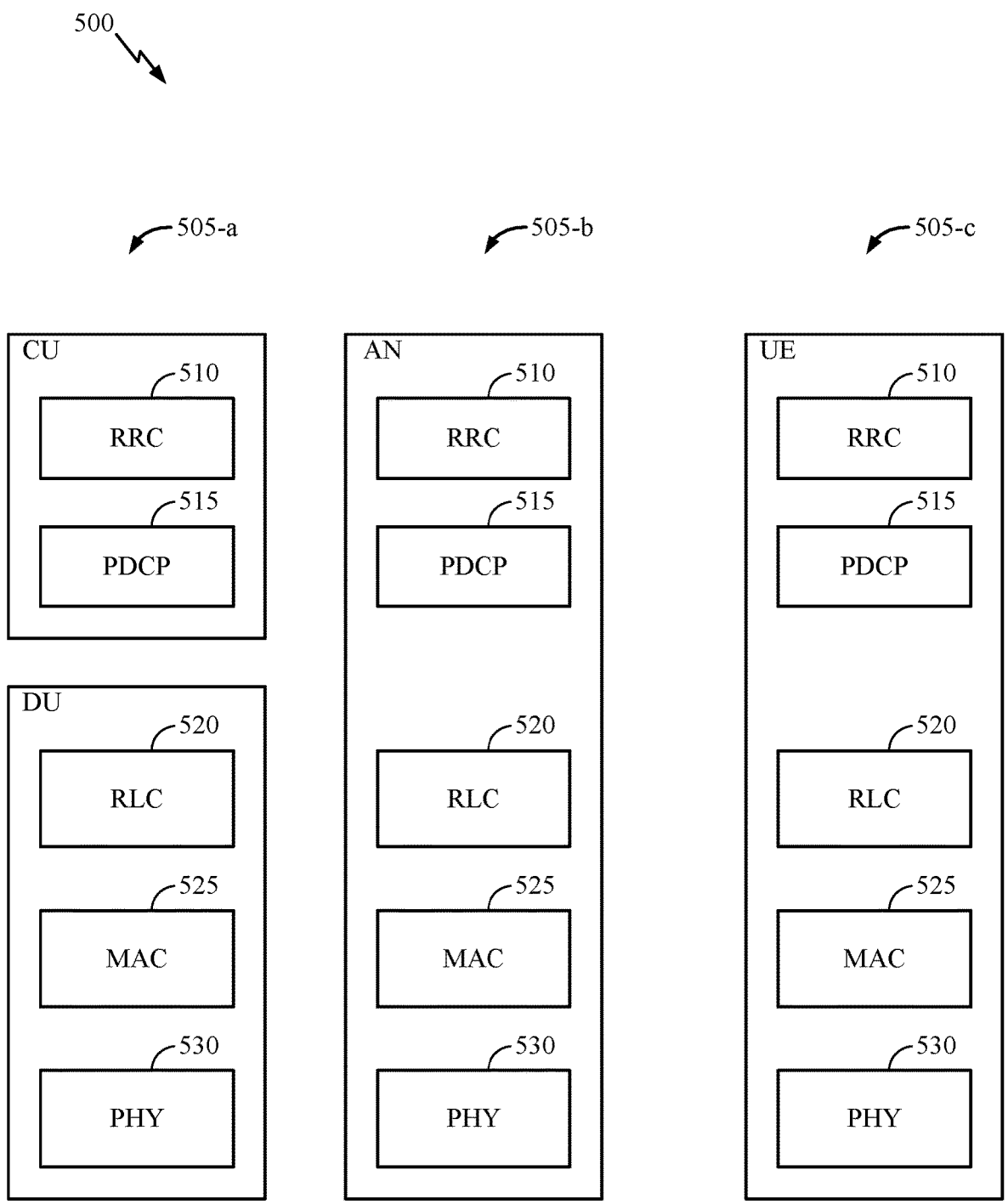
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., TRP 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-*c* (e.g., the RRC layer 510, the PDCP layer 515, the RLC layer 520, the MAC layer 525, and the PHY layer 530).

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 6:
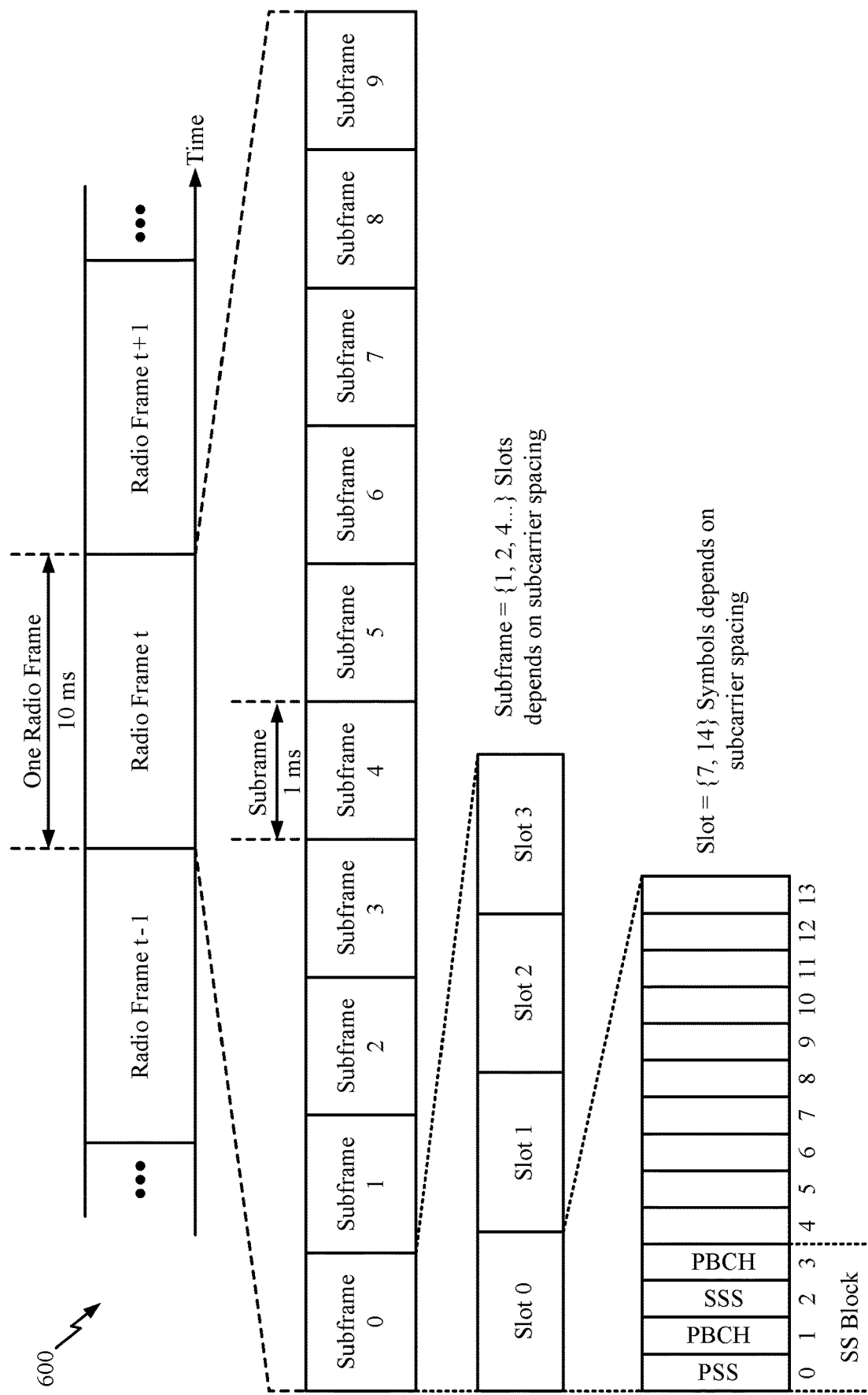
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 7:
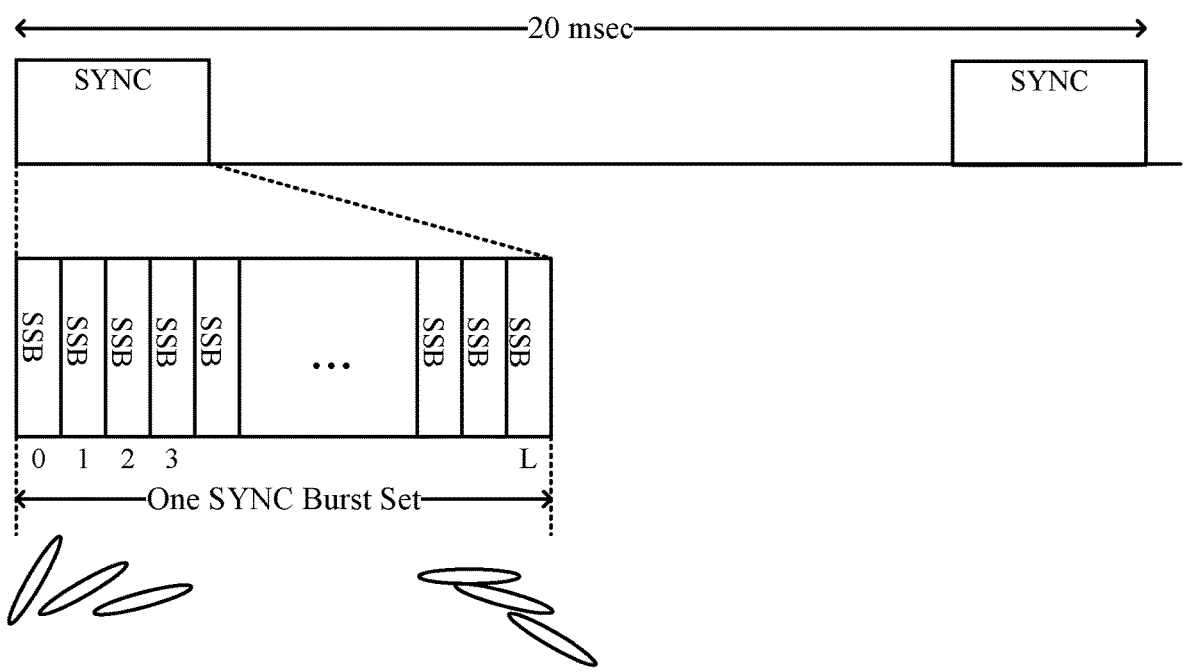
FIG. 7 illustrates different synchronization signal blocks (SSBs) sent using different beams, in accordance with certain aspects of the present disclosure.

As shown in FIG. 7, the SS blocks may be organized into SS burst sets to support beam sweeping. As shown, each SSB within a burst set may be transmitted using a different beam, which may help a UE quickly acquire both transmit (Tx) and receive (Rx) beams (e.g., for mmW applications). The UE may decode a physical cell identity (PCI) from the PSS and SSS of the SSB.

Certain deployment scenarios may include one or both NR deployment options. Some may be configured for non-standalone (NSA) and/or standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be sent in different frequencies, and may include the different types of SSB.

Operating characteristics of a gNB in an NR communications system may be dependent on a frequency range (FR) in which the system operates. A frequency range may include one or more operating bands (e.g., "n1" band, "n2" band, "n7" band, and "n41" band, etc.). A communications system (e.g., one or more gNBs and UEs) may operate in one or more operating bands.

A control resource set (CORESET) for an orthogonal frequency division multiple access (OFDMA) system (e.g., a communications system transmitting physical downlink control channel (PDCCH) using OFDMA waveforms) may include one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. Search spaces are generally areas or portions where a communication device (e.g., a UE) may look for (e.g., monitor) control information.

A CORESET may be defined in units of resource element groups (REGs). Each REG may include a fixed number (e.g., twelve) of tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs. A gNB may transmit a NR-PDCCH to a UE in a set of CCEs, called a decoding candidate, within a search space for the UE. The UE may receive the NR-PDCCH by searching (e.g., monitoring) in search spaces and decoding the NR-PDCCH.

During initial access, a UE may identify an initial CORESET (e.g., referred to as CORESET #0) configuration from an indication field (e.g., a pdcchConfigSIB1 field) in system information (e.g., in a maser information block (MIB) carried in PBCH). This initial CORESET may then be used to configure the UE (e.g., with other CORESETs and/or bandwidth parts via dedicated (UE-specific) signaling). When the UE detects a control channel in the CORESET, the UE attempts to decode the control channel, and the UE communicates with the transmitting BS (e.g., the transmitting cell) according to the control information provided in a decoded control channel.

When a UE is connected to a cell (or BS), the UE may receive a master information block (MIB). The MIB can be in a synchronization signal and physical broadcast channel (SS/PBCH) block (e.g., in the PBCH of the SS/PBCH block) on a synchronization raster (sync raster). In some scenarios, the sync raster may correspond to an SSB. From the frequency of the sync raster, the UE may determine an operating band of the cell. Based on a cell's operation band, the UE may determine a minimum channel bandwidth and a subcarrier spacing (SCS) of the channel. The UE may then determine an index from the MIB (e.g., four bits in the MIB, conveying an index in a range 0-15).

Given this index, the UE may look up or locate a CORESET configuration (this initial CORESET configured via the MIB is generally referred to as the CORESET #0). This may be accomplished from one or more tables of CORESET configurations. These configurations (including single table scenarios) may include various subsets of indices indicating valid CORESET configurations for various combinations of minimum channel bandwidth and SCS. In some arrangements, each combination of minimum channel bandwidth and SCS may be mapped to a subset of indices in the table.

Alternatively or additionally, the UE may select a search space CORESET configuration table from several tables of CORESET configurations. These configurations can be based on a minimum channel bandwidth and SCS. The UE may then look up a CORESET configuration (e.g., a Type0-PDCCH search space CORESET configuration) from the selected table, based on the index. After determining the CORESET configuration (e.g., from the single table or the selected table), the UE may then determine the CORESET to be monitored (as mentioned above) based on the location (in time and frequency) of the SS/PBCH block and the CORESET configuration.

Figure 8:
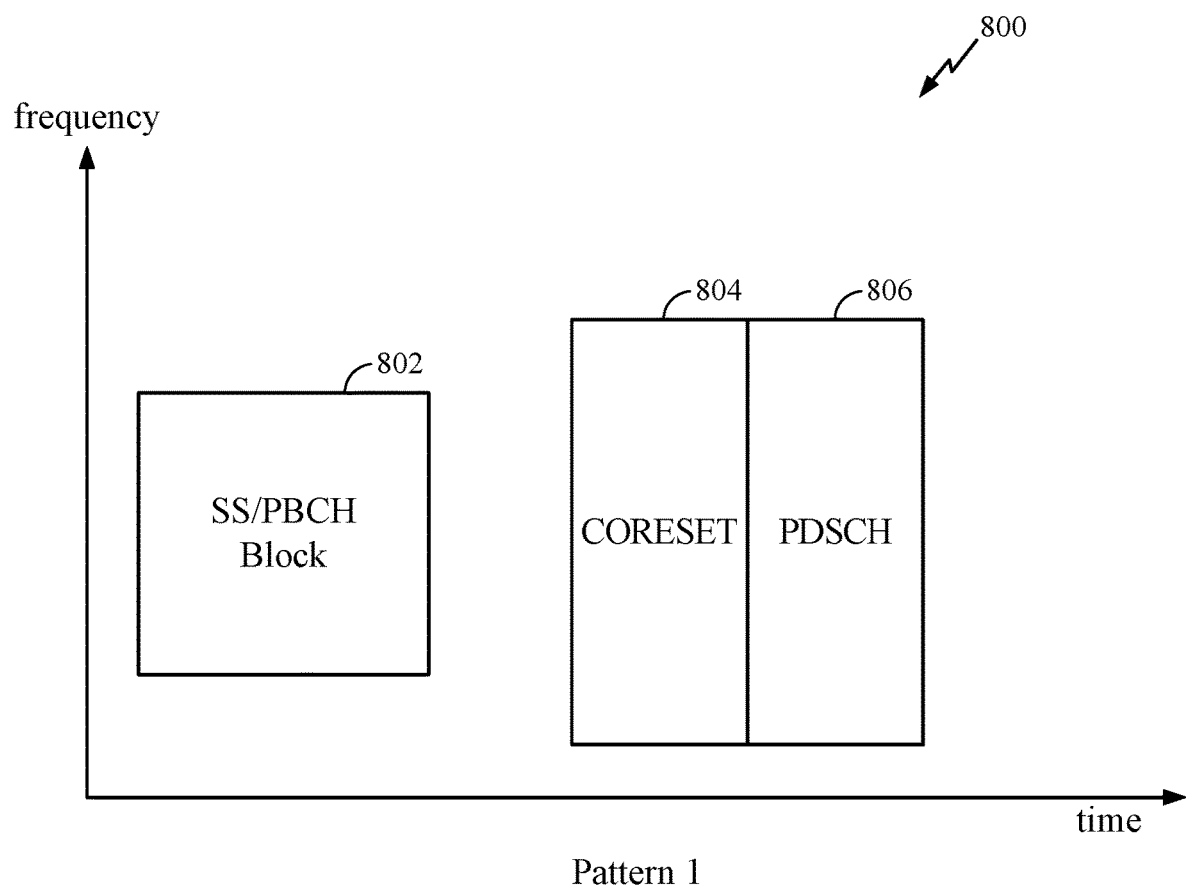
FIG. 8 shows an exemplary transmission resource mapping, according to aspects of the present disclosure.

FIG. 8 shows an example transmission resource mapping 800, according to aspects of the present disclosure. In the mapping, a BS (e.g., BS 110a, shown in FIG. 1) transmits an SS/PBCH block 802. The SS/PBCH block includes a MIB conveying an index to a table that relates the time and frequency resources of the CORESET 804 to the time and frequency resources of the SS/PBCH block.

The BS may also transmit control signaling. In some scenarios, the BS transmits the control signaling in a PDCCH to a UE (e.g., UE 120a, shown in FIG. 1) in the (time/frequency resources of the) CORESET 804. The PDCCH may schedule a PDSCH 806. The BS then transmits the PDSCH 806 to the UE. The UE may receive the MIB in the SS/PBCH block 802, determine the index, look up a CORESET configuration based on the index, and determine the CORESET 804 from the CORESET configuration and the SS/PBCH block. The UE may then monitor the CORESET 804, decode the PDCCH in the CORESET 804, and receive the PDSCH 806 that was allocated by the PDCCH.

Different CORESET configurations may have different parameters that define a corresponding CORESET. For example, each configuration may indicate a number of resource blocks (e.g., 24, 48, or 96), a number of symbols (e.g., 1-3), as well as an offset (e.g., 0-38 RBs) that indicates a location in frequency.

As discussed above, aspects of the disclosure related to QCL reference signals for uplink TCI states.

It may be desirable for a UE to know which assumptions the UE can make on a channel for different transmissions. For example, the UE should know which reference signals the UE can use to estimate the channel in order to decode a transmitted signal (e.g., PDCCH or PDSCH). It may also be desirable for the UE to be able to report relevant channel state information (CSI) to the BS for scheduling, link adaptation, and/or beam management purposes. In NR, the concept of QCL and TCI states is used to convey information about these assumptions.

QCL assumptions are generally defined in terms of channel properties. For example, 3GPP TS 38.214 defines QCL as "two antenna ports are said to be quasi-co-located if properties of the channel over which a symbol on one antenna port is conveyed can be inferred from the channel over which a symbol on the other antenna port is conveyed." Different reference signals (RSs) may be considered quasi co-located (QCL'd) if a receiver can apply channel properties determined by detecting a first reference signal to help detect a second signal. TCI states generally include configurations such as QCL-relationships, such as the relationships between the downlink (DL) source RSs in one CSI reference signal (CSI-RS) set and the target PDSCH demodulation reference signal (DMRS) ports.

In some cases, a UE may be configured with up to M TCI states. Configuration of the M TCI states may be via higher layer signalling (e.g., a higher layer parameter TCI-States). A UE may be signalled to decode PDSCH according to a detected PDCCH with downlink control information (DCI) indicating one of the TCI states. Each configured TCI state may include one RS set (e.g., by higher layer parameter TCI-RS-SetConfig) that indicates different QCL assumptions between certain source and target signals.

QCL signaling may be provided for RSs and channels across scenarios involving multiple cells, such as in coordinated multipoint (CoMP) scenarios in which multiple transmit receive points (TRPs) or integrated access and backhaul (IAB) nodes each have their own cell ID.

FIG. 9 is a table 900 illustrating examples of the association of DL reference signals with corresponding QCL types that may be indicated by a parameter (e.g., TCI-RS-SetConfig).

The table 900 shows source RSs, target RSs, and QCL type assumptions that may be configured by a valid UL-TCI state configuration. The target signal generally refers to a signal for which channel properties may be inferred by measuring those channel properties for an associated source signal. As noted above, a UE may use the source RS to determine various channel parameters, depending on the associated QCL type, and use those various channel properties (determined based on the source RS) to process the target signal. Examples of source RSs include phase tracking reference signals (PTRSs), SSBs, sounding reference signal (SRS), and/or CSI-RSs (e.g., CSI-RS for beam management). Examples of target RSs include aperiodic tracking reference signals (TRSs), periodic TRSs, PRACHs, PUCCHs, and/or PUSCHs. The QCL types include the QCL types A/B/C/D discussed below.

For the case of two source RSs, the different QCL types can be configured for the same target RS. In the illustrative example, SSB is associated with TypeC QCL for P-TRS, while CSI-RS for beam management (CSI-RS-BM) is associated with TypeD QCL.

QCL types indicated to the UE can be based on a higher layer parameter (e.g., higher layer parameter QCL-Type). QCL types and may take one or a combination of the following types:

QCL-TypeA: {Doppler shift, Doppler spread, average delay, delay spread},

QCL-TypeB: {Doppler shift, Doppler spread},

QCL-TypeC: {average delay, Doppler shift}, and

QCL-TypeD: {Spatial Rx parameter},

Spatial QCL assumptions (QCL-TypeD) may be used to help a UE to select an analog receive (Rx) beam (e.g., during beam management procedures). For example, an SSB resource indicator may indicate a same beam for a previous reference signal should be used for a subsequent transmission.

An information element (e.g., CORESET IE) sent via RRC signaling may convey information regarding a CORESET configured for a UE. The CORESET IE generally includes a CORESET ID, an indication of frequency domain resources (e.g., number of RBs) assigned to the CORESET, contiguous time duration of the CORESET in a number of symbols, and TCI states.

As noted above, a subset of the TCI states provide QCL relationships between DL RS(s) in one RS set (e.g., a TCI set) and another signal (e.g., DMRS ports for another transmission). A particular TCI state for a given UE (e.g., for unicast PDCCH) may be conveyed to the UE by a MAC-CE. The TCI state may be selected from the set of TCI states conveyed by the CORESET IE, with the initial CORESET (CORESET #0) generally configured via MIB.

Search space information may also be provided via RRC signaling. For example, the SearchSpace IE is another RRC IE that defines how and where to search for PDCCH candidates for a given CORESET. Each search space is associated with one CORESET. The SearchSpace IE identifies a search space configured for a CORESET by a search space ID. In an aspect, the search space ID associated with CORESET #0 is SearchSpace ID #0. The search space is generally configured via PBCH (e.g., carried in the MIB).

Aspects of the present disclosure relate to techniques for QCL reference signals for uplink TCI states.

Example QCL Reference Signals for Uplink TCI States

According to aspects of the present disclosure, a base station (BS) and a user equipment (UE) may have a transmission configuration indicator (TCI) framework for downlink and/or uplink beam indication. The BS can configure and/or indicate panel-specific transmission for uplink transmission via an uplink TCI framework or a panel ID. If the BS uses an uplink TCI framework, in some systems, uplink TCI based signalling is supported, where a new panel identifier (ID) may or may not be introduced and a panel specific signalling is performed using uplink TCI state.

Aspects of the present disclosure involve including quasi co-located (QCL) types with an uplink TCI so that a UE may know which assumptions the UE can make on a channel for different transmissions.

If the BS uses a panel ID, the panel ID may be implicitly or explicitly applied to the transmission for a target RS resource or resource set. The target RS resource may be a physical uplink control channel (PUCCH) resource, a sounding reference signal (SRS) resource, a physical uplink shared channel (PUSCH) resource, and/or a physical random access channel (PRACH) resource.

For a TCI framework for downlink and/or uplink beam indications, the uplink TCI may indicate a source reference signal (RS) associated with the uplink transmit beam for a target uplink RS and/or a target uplink channel. In some cases, the source RS may be an SRS, a synchronization signal block (SSB), and/or a channel state information (CSI) RS (CSI-RS). The target uplink RS or channel may be a PUCCH, SRS, PRACH, and/or PUSCH.

Figure 10:
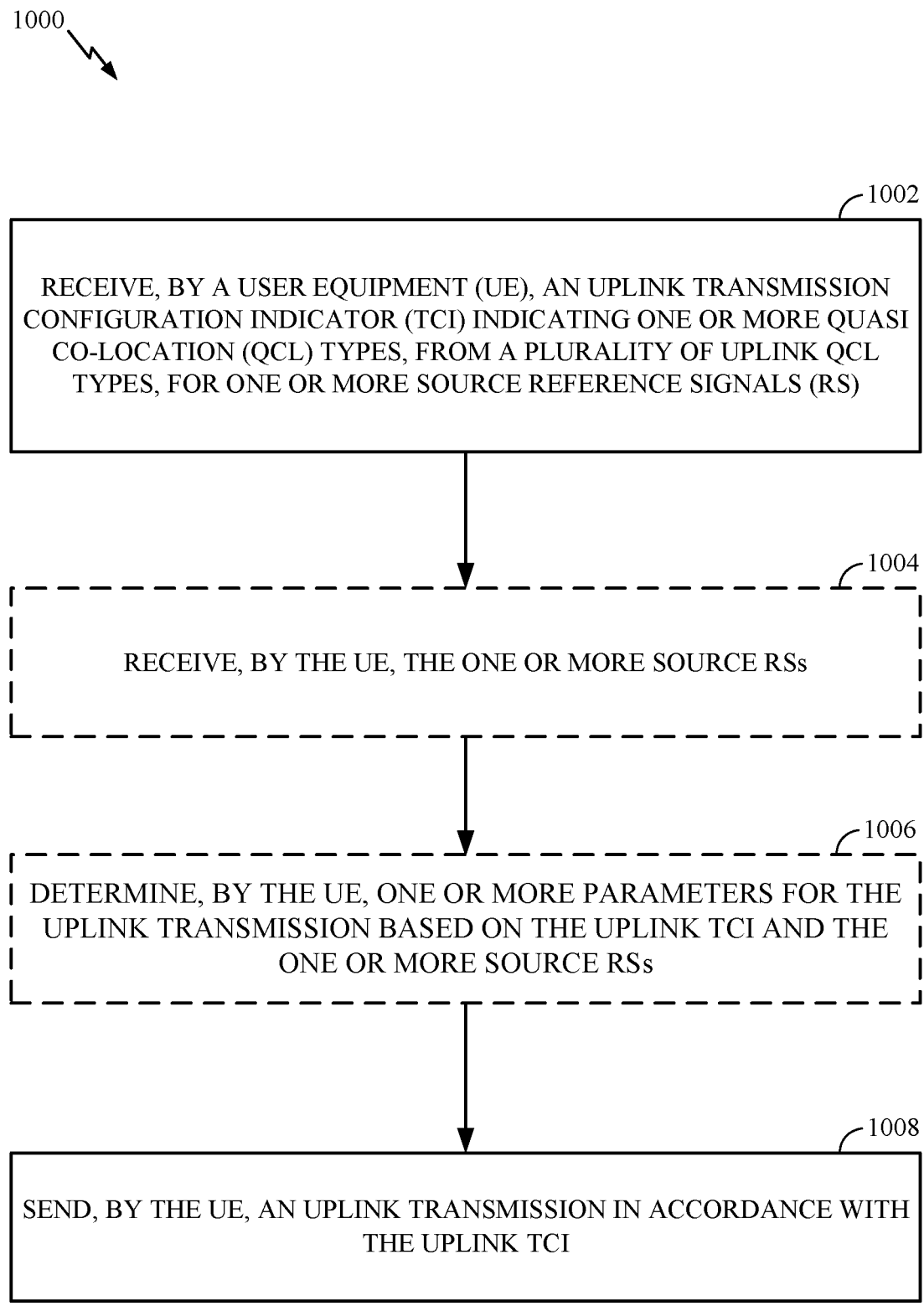
FIG. 10 is a flow diagram illustrating example operations for wireless communications by a UE, in accordance with certain aspects of the present disclosure.

FIG. 10 illustrates example operations 1000 for wireless communications by a UE, in accordance with certain aspects of the present disclosure. For example, operations 1000 may be performed by a UE 120 of FIG. 1. The operations 1000 may be implemented as software components that are executed and run on one or more processors (e.g., controller/processor 480 of FIG. 2). Further, the transmission and reception of signals by the UE in operations 1000 may be enabled, for example, by one or more antennas (e.g., antennas 452 of FIG. 2). In certain aspects, the transmission and/or reception of signals by the UE may be implemented via a bus interface of one or more processors (e.g., controller/processor 480) obtaining and/or outputting signals.

Operations 1000 begin, at 1002, by receiving an uplink TCI indicating one or more quasi co-location (QCL) types, from a plurality of uplink QCL types, for one or more source RSs. The uplink TCI may indicate multiple QCL types from the plurality of uplink QCL types for multiple source RSs. One of the plurality of uplink QCL types may indicate a spatial relation between one of the source RSs and the uplink transmission, and one or more of the plurality of uplink QCL types indicates a Doppler shift, average delay, Doppler spread, delay spread, or a combination thereof, associated with the one or more source RSs and the uplink transmission.

In some aspects, at 1004, the UE may receive the one or more source RSs. The one or more source RS may include SRSs, SSBs, CSI-RSs, or a combination thereof.

In some aspects, at 1006, the UE may determine one or more parameters for the uplink transmission based on the uplink TCI and the one or more source RSs. The one or more parameters may include a beam, a time, a frequency, a transmit power, or a combination thereof for the uplink transmission.

At 1008, the UE sends an uplink transmission in accordance with the uplink TCI. In some aspects, different types of uplink transmissions may be associated with different sets of uplink QCL types. The one or more uplink transmissions may include a PUCCH transmission, a RACH transmission, a PUSCH transmission, or a combination thereof.

Figure 11:
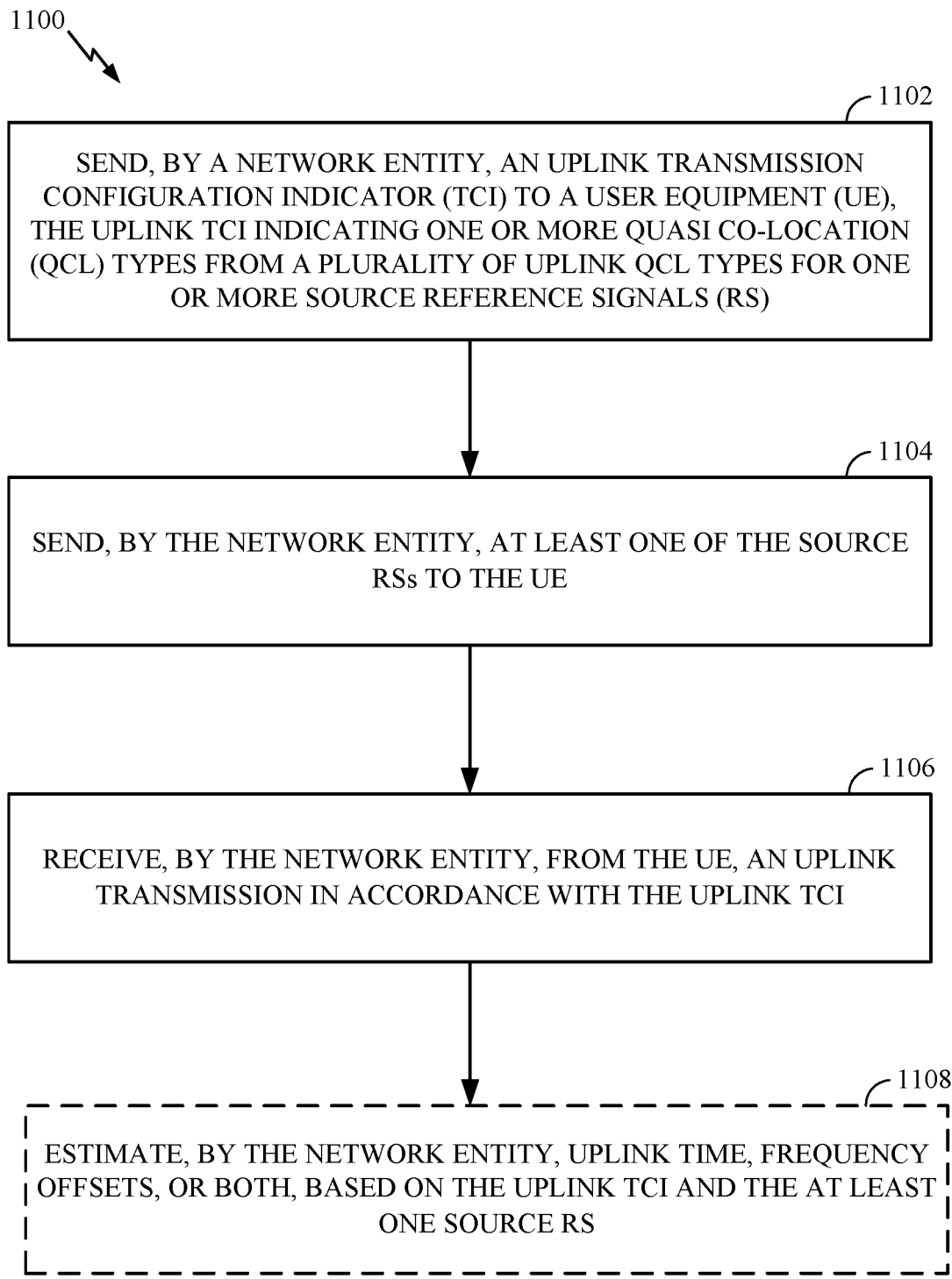
FIG. 11 is a flow diagram illustrating example operations for wireless communications by a network entity, in accordance with certain aspects of the present disclosure.

FIG. 11 illustrates example operations 1100 for wireless communications, in accordance with certain aspects of the present disclosure. For example, operations 1100 may be performed by a network entity, such as a base station (BS) (e.g., BS 110a of FIG. 1 which may be a gNB). The operations 1100 may be implemented as software components that are executed and run on one or more processors (e.g., controller/processor 240 of FIG. 2). Further, the transmission and reception of signals by the BS in operations 1100 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 1100 begin, at 1102, by sending an uplink TCI to a UE, the uplink TCI indicating one or more QCL types from a plurality of uplink QCL types for one or more source RS. The uplink TCI may indicate multiple QCL types from the plurality of uplink QCL types for multiple source RSs. One of the plurality of uplink QCL types may indicate a spatial relation between one of the source RSs and the uplink transmission, and one or more of the plurality of uplink QCL types indicates a Doppler shift, average delay, Doppler spread, delay spread, or a combination thereof, associated with the one or more source RSs and the uplink transmission.

At 1104, the network entity sends at least one of the source RSs to the UE. The one or more source RS may include SRSs, SSBs, CSI-RSs, or a combination thereof.

At 1106, the network entity receives, from the UE, an uplink transmission in accordance with the uplink TCI. In some aspects, different types of uplink transmissions may be associated with different sets of uplink QCL types. The uplink transmission may include a PUCCH transmission, a RACH transmission, a PUSCH transmission, or a combination thereof.

In some aspects, at 1108, the network entity estimates uplink time, frequency offsets, or both, based on the uplink TCI and the at least one source RS.

In some systems, each configured uplink TCI state only contains one source RS for uplink transmit beam indication, similar to QCL TypeD RS in downlink TCI state. Accordingly, other uplink QCL Type RSs for gNB may be used to estimate uplink time and/or frequency offset.

Besides the source RS for uplink spatial relation indication, each configured uplink TCI state can contain at least one uplink QCL Type RSs. For example, the configured uplink TCI state can be used to estimate uplink Doppler and/or delay spread statistics for uplink time/frequency offset compensation. As mentioned, the QCL may take one or a combination of the following types:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial filter parameter}

In some aspects, the UE receives a timing reference signal (TRS) parameter per SRS resource or per SRS resource set. The corresponding SRS resources can serve as other uplink QCL Type RSs, including an uplink non-spatial relation indication.

In some aspects, the UE receives a repetition parameter per SRS resource set. Generally, a repetition factor is configured per SRS resource.

In some aspects, each target uplink RS and/or channel has its own set of combinations of different QCL Type RSs. The target uplink RS and/or channel may include SRS resources or resource sets. These SRS resources or resource sets may be configured with a TRS parameter and/or with usage as beam management (BM). The SRS resource or resource set may be classified as periodic (P), semi-persistent (SP), and/or aperiodic (AP). In some examples, the target uplink RS and/or channel may include PUCCH, PUSCH, and/or PRACH. Each combination of QCL Type RSs for the target uplink RS and/or channel may include a corresponding uplink QCL types. The corresponding uplink QCL type may be any combination of uplink QCL TypeA, QCL-TypeB, QCL-TypeC, and/or QCL-TypeD. In some cases (e.g., for Frequency Range 2 (FR2)), the combination may include uplink QCL TypeD. In some cases (e.g., for Frequency Range (FR1)), the combination may not include uplink QCL TypeD.

Figure 12:
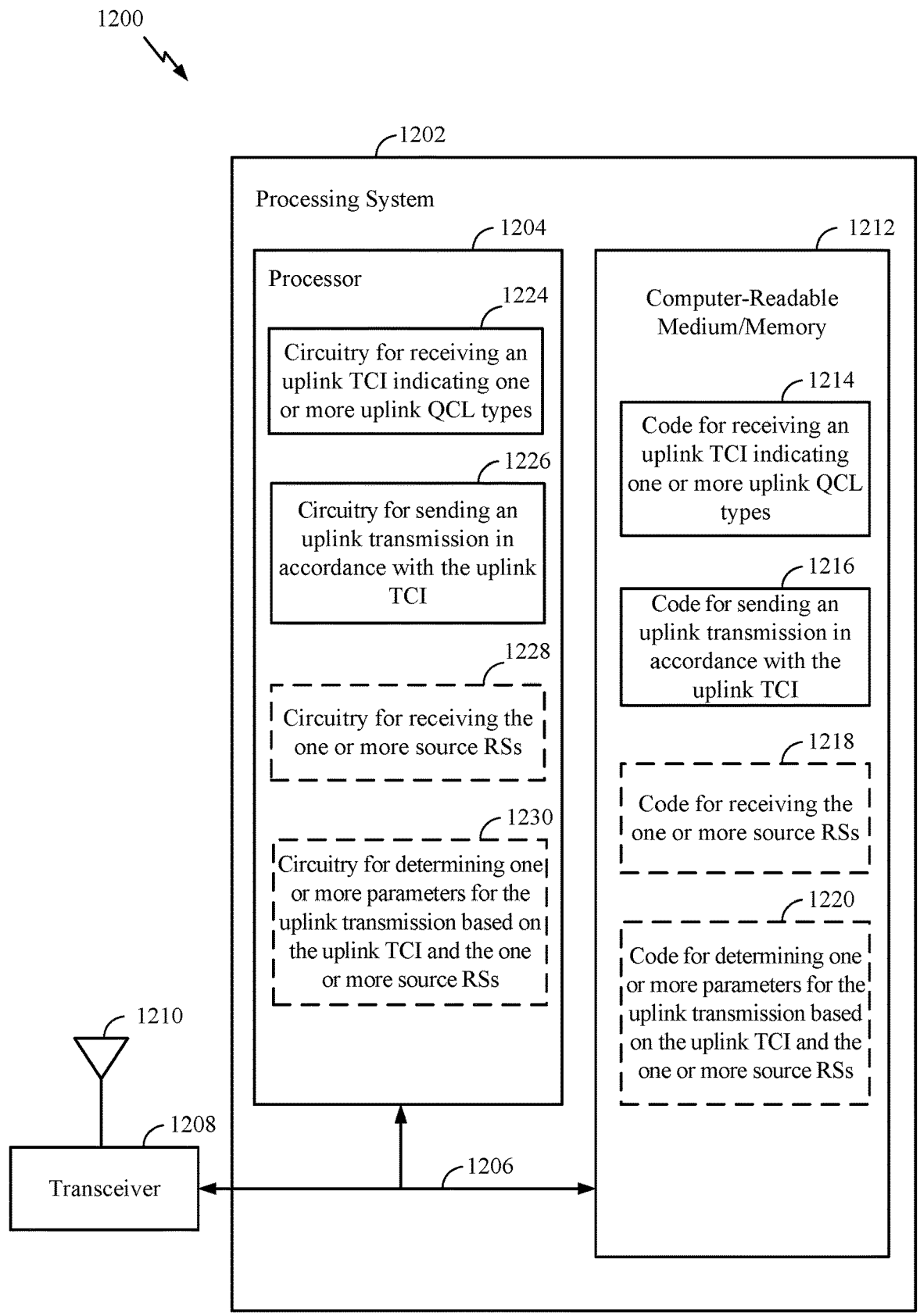
FIG. 12 is a block diagram illustrating a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 10. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

Figure 13:
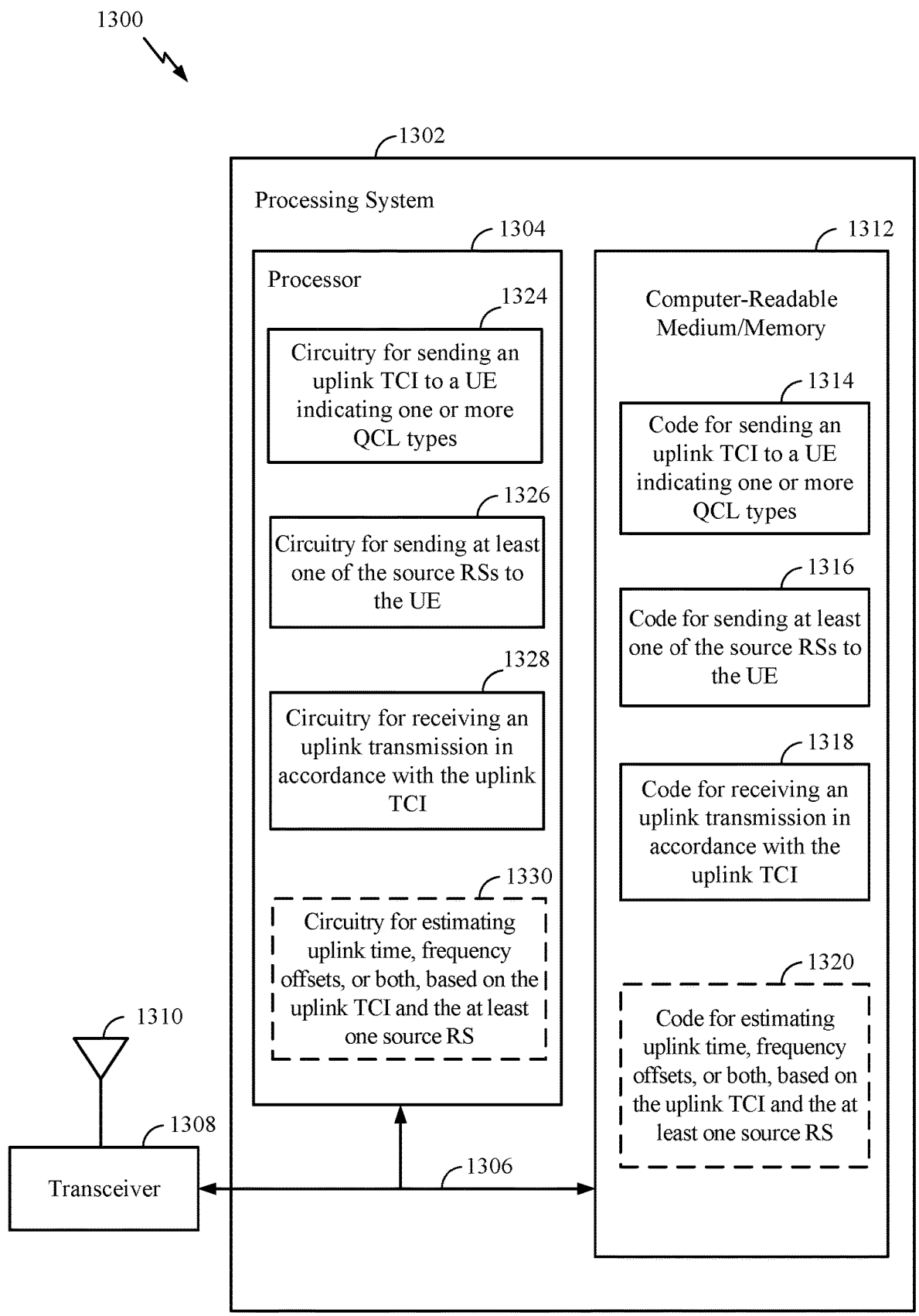
FIG. 13 is a block diagram illustrating a communications device that may include various components configured to perform operations for the techniques disclosed herein in accordance with aspects of the present disclosure.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 10, or other operations for performing the various techniques discussed herein for QCL reference signals for uplink TCI states. In certain aspects, computer-readable medium/memory 1212 stores code 1214 for receiving an uplink TCI indicating one or more uplink QCL types, from a plurality of uplink QCL types, for one or more source RSs; and code 1216 for sending an uplink transmission in accordance with the uplink TCI. In certain aspects, computer-readable medium/memory 1212 may store code 1218 for receiving the one or more source RSs; and/or code 1220 for determining one or more parameters for the uplink transmission based on the uplink TCI and the one or more source RSs. In certain aspects, the processor 1204 has circuitry configured to implement the code stored in the computer-readable medium/memory 1212. The processor 1204 includes circuitry 1224 for receiving an uplink TCI indicating one or more uplink QCL types, from a plurality of uplink QCL types, for one or more source RSs; circuitry 1226 for sending an uplink transmission in accordance with the uplink TCI. In certain aspects, the processor 1204 may include circuitry 1228 for receiving the one or more source RSs; and/or circuitry 1230 for determining one or more parameters for the uplink transmission based on the uplink TCI and the one or more source RSs FIG. 13 illustrates a communications device 1300 that may include various components (e.g., corresponding to means-plus-function components) configured to perform operations for the techniques disclosed herein, such as the operations illustrated in FIG. 11. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 11, or other operations for performing the various techniques discussed herein for QCL reference signals for uplink TCI states. In certain aspects, computer-readable medium/memory 1312 stores code 1314 for sending an uplink TCI to a UE, the uplink TCI indicating one or more QCL types from a plurality of uplink QCL types for one or more source RS; code 1316 for sending at least one of the source RSs to the UE; and/or code 1318 for receiving, from the UE, an uplink transmission in accordance with the uplink TCI. In certain aspects, computer-readable medium/memory 1312 may store code for estimating uplink time, frequency offsets, or both, based on uplink TCI and the at least one source RS. In certain aspects, the processor 1304 has circuitry configured to implement the code stored in the computer-readable medium/memory 1312. The processor 1304 includes circuitry 1324 for sending an uplink TC) to a UE, the uplink TCI indicating one or more QCL types from a plurality of uplink QCL types for one or more source RS; circuitry 1326 for sending at least one of the source RSs to the UE; and circuitry 1328 for receiving, from the UE, an uplink transmission in accordance with the uplink TCI. In certain aspects, the processor 1304 may include circuitry 1330 for estimating uplink time, frequency offsets, or both, based on uplink TCI and the at least one source RS.

Example Aspects

In a first aspect, a method of wireless communications by a user equipment (UE), includes: receiving an uplink transmission configuration indicator (TCI) indicating one or more uplink quasi co-location (QCL) types, from a plurality of uplink QCL types, for one or more source reference signals (RSs); and sending an uplink transmission in accordance with the uplink TCI.

In a second aspect, in combination with the first aspect, the uplink TCI indicates multiple uplink QCL types from the plurality of uplink QCL types for multiple source RSs.

In a third aspect, in combination with any of the first and second aspects, the method further includes receiving the one or more source RSs; and determining one or more parameters for the uplink transmission based on the uplink TCI and the one or more source RSs.

In a fourth aspect, in combination with the third aspect, the one or more parameters include a beam, a time, a frequency, a transmit power, or a combination thereof for the uplink transmission.

In a fifth aspect, in combination with any of the first through fourth aspects, one of the plurality of uplink QCL types indicates a spatial relation between one of the source RSs and the uplink transmission; and one or more of the plurality of uplink QCL types indicates a Doppler shift, average delay, Doppler spread, delay spread, or a combination thereof, associated with the one or more source RSs and the uplink transmission.

In a sixth aspect, in combination with the fifth aspect, the plurality of uplink QCL types comprises: a first QCL type that indicates QCL assumptions regarding the Doppler shift, Doppler spread, average delay, and delay spread; a second QCL type that indicates QCL assumptions regarding the Doppler shift and Doppler spread; a third QCL type that indicates the Doppler shift and average delay; and a fourth QCL type that indicates QCL assumptions regarding spatial relationships.

In a seventh aspect, in combination with any of the first through sixth aspects, the one or more source RSs include sounding reference signals (SRSs), synchronization signal blocks (SSBs), channel-state information RSs (CSI-RSs), or a combination thereof; and the uplink transmission includes physical uplink control channel (PUCCH) transmission, an SRS transmission, a random access channel (RACH) transmission, a physical uplink shared channel (PUSCH) transmission, or a combination thereof.

In an eighth aspect, in combination with any of the first through seventh aspects, different types of uplink transmission are associated with different sets of uplink QCL types.

In a ninth aspect, in combination with any of the first through eighth aspects, the method further includes receiving signaling indicating timing reference signal (TRS) information per sounding reference signal (SRS) resource or per SRS resource set for the uplink transmission.

In a tenth aspect, in combination with any of the first through ninth aspects, the method further includes receiving signaling indicating a number of repetitions per sounding reference signal (SRS) resource set for the uplink transmission.

In an eleventh aspect, a method of wireless communications by a network entity, includes: sending an uplink transmission configuration indicator (TCI) to a user equipment (UE), the uplink TCI indicating one or more quasi co-location (QCL) types from a plurality of uplink QCL types for one or more source reference signals (RS); sending at least one of the source RSs to the UE; and receiving, from the UE, an uplink transmission in accordance with the uplink TCI.

In a twelfth aspect, in combination with the eleventh aspect, the method further includes estimating uplink time, frequency offsets, or both, based on the uplink TCI and the at least one source RS.

In a thirteenth aspect, in combination with any of the eleventh through twelfth aspects, the uplink TCI indicates multiple QCL types from the plurality of QCL types for multiple source RSs.

In a fourteenth aspect, in combination with any of the eleventh through thirteenth aspects, the method further includes: determining, based on the at least one of the source RSs and the uplink TCI, a beam, a time, a frequency, a transmit power, or a combination therefore, for the uplink transmission; and monitoring the uplink transmission based on the determination.

In a fifteenth aspect, in combination with any of the eleventh through fourteenth aspects, one of the plurality of uplink QCL types indicates a spatial relation between one of the source RSs and the uplink transmission; and one or more of the plurality of uplink QCL types indicates a Doppler shift, average delay, Doppler spread, delay spread, or a combination thereof, associated with the one or more source RSs and the uplink transmission.

In a sixteenth aspect, in combination with any of the eleventh through fifteenth aspects, the plurality of uplink QCL types comprises: a first QCL type that indicates QCL assumptions regarding Doppler shift, Doppler spread, average delay, and delay spread; a second QCL type that indicates QCL assumptions regarding Doppler shift and Doppler spread; a third QCL type that indicates Doppler shift and average delay; and a fourth QCL type that indicates QCL assumptions regarding spatial relationships.

In a seventeenth aspect, in combination with any of the eleventh through sixteenth aspects, the one or more source RS includes sounding reference signals (SRSs), synchronization signal blocks (SSBs), channel-state information RSs (CSI-RSs), or a combination thereof; and the uplink transmission includes physical uplink control channel (PUCCH) transmission, an SRS transmission, a random access channel (RACH) transmission, a physical uplink shared channel (PUSCH) transmission, or a combination thereof.

In a eighteenth aspect, in combination with any of the eleventh through seventeenth aspects, different types of uplink transmission are associated with different sets of uplink QCL types.

In a nineteenth aspect, in combination with any of the eleventh through eighteenth aspects, the method further includes sending the UE signaling indicating timing reference signal (TRS) information per sounding reference signal (SRS) resource or per SRS resource set for the uplink transmission.

In a twentieth aspect, in combination with any of the eleventh through nineteenth aspects, the method further includes sending the UE signaling indicating a number of repetitions per sounding reference signal (SRS) resource set for the uplink transmission.

In a twenty-first aspect, in combination with any of the eleventh through twentieth aspects, each of the one or more RSs is associated with a respective set of QCL-type RSs.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 10-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a user equipment (UE), comprising:
   receiving an uplink transmission configuration indicator (TCI) indicating one or more uplink quasi co-location (QCL) types, from a plurality of uplink QCL types, for one or more source reference signals (RSs); and
   sending an uplink transmission in accordance with the uplink TCI, wherein different types of uplink transmission are associated with different sets of uplink QCL types such that a first uplink transmission is associated with a first QCL uplink type and a second uplink transmission is associated with a second uplink QCL type.

2. The method of claim 1, wherein the uplink TCI indicates multiple uplink QCL types from the plurality of uplink QCL types for multiple source RSs.

3. The method of claim 1, further comprising:
receiving the one or more source RSs; and
determining one or more parameters for the uplink transmission based on the uplink TCI and the one or more source RSs.

4. The method of claim 3, wherein the one or more parameters include a beam, a time, a frequency, a transmit power, or a combination thereof for the uplink transmission.

5. The method of claim 1, wherein:
one of the plurality of uplink QCL types indicates a spatial relation between one of the source RSs and the uplink transmission; and
one or more of the plurality of uplink QCL types indicates a Doppler shift, average delay, Doppler spread, delay spread, or a combination thereof, associated with the one or more source RSs and the uplink transmission.

6. The method of claim 5, wherein the plurality of uplink QCL types comprises:
the first QCL type that indicates QCL assumptions regarding the Doppler shift, Doppler spread, average delay, and delay spread;
the second QCL type that indicates QCL assumptions regarding the Doppler shift and Doppler spread;
a third QCL type that indicates the Doppler shift and average delay; and
a fourth QCL type that indicates QCL assumptions regarding spatial relationships.

7. The method of claim 1, wherein:
the one or more source RSs include sounding reference signals (SRSs), synchronization signal blocks (SSBs), channel-state information RSs (CSI-RSs), or a combination thereof; and
the uplink transmission includes physical uplink control channel (PUCCH) transmission, an SRS transmission, a random access channel (RACH) transmission, a physical uplink shared channel (PUSCH) transmission, or a combination thereof.

8. The method of claim 1, further comprising receiving signaling indicating timing reference signal (TRS) information per sounding reference signal (SRS) resource or per SRS resource set for the uplink transmission.

9. The method of claim 1, further comprising receiving signaling indicating a number of repetitions per sounding reference signal (SRS) resource set for the uplink transmission.

10. A method of wireless communications by a network entity, comprising:
sending an uplink transmission configuration indicator (TCI) to a user equipment (UE), the uplink TCI indicating one or more quasi co-location (QCL) types from a plurality of uplink QCL types for one or more source reference signals (RS);
sending at least one of the source RSs to the UE; and
receiving, from the UE, an uplink transmission in accordance with the uplink TCI, wherein different types of uplink transmission are associated with different sets of uplink QCL types such that a first uplink transmission is associated with a first QCL uplink type and a second uplink transmission is associated with a second uplink QCL type.

11. The method of claim 10, further comprising estimating uplink time, frequency offsets, or both, based on the uplink TCI and the at least one source RS.

12. The method of claim 10, wherein the uplink TCI indicates multiple QCL types from the plurality of QCL types for multiple source RSs.

13. The method of claim 10, further comprising:
determining, based on the at least one of the source RSs and the uplink TCI, a beam, a time, a frequency, a transmit power, or a combination therefore, for the uplink transmission; and
monitoring the uplink transmission based on the determination.

14. The method of claim 10, wherein:
one of the plurality of uplink QCL types indicates a spatial relation between one of the source RSs and the uplink transmission; and
one or more of the plurality of uplink QCL types indicates a Doppler shift, average delay, Doppler spread, delay spread, or a combination thereof, associated with the one or more source RSs and the uplink transmission.

15. The method of claim 10, wherein the plurality of uplink QCL types comprises:
the first QCL type that indicates QCL assumptions regarding Doppler shift, Doppler spread, average delay, and delay spread;
the second QCL type that indicates QCL assumptions regarding Doppler shift and Doppler spread;
a third QCL type that indicates Doppler shift and average delay; and
a fourth QCL type that indicates QCL assumptions regarding spatial relationships.

16. The method of claim 10, wherein:
the one or more source RS includes sounding reference signals (SRSs), synchronization signal blocks (SSBs), channel-state information RSs (CSI-RSs), or a combination thereof; and
the uplink transmission includes physical uplink control channel (PUCCH) transmission, an SRS transmission, a random access channel (RACH) transmission, a physical uplink shared channel (PUSCH) transmission, or a combination thereof.

17. The method of claim 10, further comprising sending the UE signaling indicating timing reference signal (TRS) information per sounding reference signal (SRS) resource or per SRS resource set for the uplink transmission.

18. The method of claim 10, further comprising sending the UE signaling indicating a number of repetitions per sounding reference signal (SRS) resource set for the uplink transmission.

19. The method of claim 10, wherein each of the one or more RSs is associated with a respective set of QCL-type RSs.

20. An apparatus of wireless communications, comprising:
at least one processor; and
a memory coupled to the at least one processor, the memory comprising code executable by the at least one processor to cause the apparatus to:
receive an uplink transmission configuration indicator (TCI) indicating one or more uplink quasi co-location (QCL) types, from a plurality of uplink QCL types, for one or more source reference signals (RSs); and send an uplink transmission in accordance with the uplink TCI, wherein different types of uplink transmission are associated with different sets of uplink QCL types such that a first uplink transmission is associated with a first QCL uplink type and a second uplink transmission is associated with a second uplink QCL type.

21. The apparatus of claim 20, wherein the uplink TCI indicates multiple uplink QCL types from the plurality of uplink QCL types for multiple source RSs.

22. The apparatus of claim 20, wherein the memory further comprises code to cause the apparatus to receive the one or more source RSs; and determine one or more parameters for the uplink transmission based on the uplink TCI and the one or more source RSs.

23. The apparatus of claim 22, wherein the one or more parameters include a beam, a time, a frequency, a transmit power, or a combination thereof for the uplink transmission.

24. The apparatus of claim 20, wherein:

one of the plurality of uplink QCL types indicates a spatial relation between one of the source RSs and the uplink transmission; and one or more of the plurality of uplink QCL types indicates a Doppler shift, average delay, Doppler spread, delay spread, or a combination thereof, associated with the one or more source RSs and the uplink transmission.

25. An apparatus of wireless communications, comprising:

at least one processor; and a memory coupled to the at least one processor, the memory comprising code executable by the at least one processor to cause the apparatus to:

send an uplink transmission configuration indicator (TCI) to a user equipment (UE), the uplink TCI indicating one or more quasi co-location (QCL) types from a plurality of uplink QCL types for one or more source reference signals (RS);

send at least one of the source RSs to the UE; and receive, from the UE, an uplink transmission in accordance with the uplink TCI, wherein different types of uplink transmission are associated with different sets of uplink QCL such that a first uplink transmission is associated with a first QCL uplink type and a second uplink transmission is associated with a second uplink QCL type.

26. The apparatus of claim 25, wherein the memory further comprises code to cause the apparatus to:

estimate uplink time, frequency offsets, or both, based on the uplink TCI and the at least one source RS.

27. The apparatus of claim 25, wherein the uplink TCI indicates multiple QCL types from the plurality of QCL types for multiple source RSs.

28. The apparatus of claim 25, wherein the code to cause the apparatus receiving the uplink transmission involves a beam, a time, a frequency, a transmit power determined based a downlink RS; or a combination thereof for the uplink transmission.

* * * * *